United States Patent
Cote et al.

(10) Patent No.: US 10,486,994 B2
(45) Date of Patent: *Nov. 26, 2019

(54) TREATMENT OF PHOSPHATE-CONTAINING WASTEWATER

(71) Applicant: OSTARA NUTRIENT RECOVERY TECHNOLOGIES INC., Vancouver (CA)

(72) Inventors: Pierre Cote, Dundas (CA); Ahren Britton, North Vancouver (CA); Ram Prasad Melahalli Sathyanarayana, Lithia, FL (US); Rhonda Maria Hyslop, North Vancouver (CA)

(73) Assignee: Ostara Nutrient Recovery Technologies Inc., Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/201,786

(22) Filed: Nov. 27, 2018

(65) Prior Publication Data
US 2019/0106348 A1    Apr. 11, 2019

Related U.S. Application Data

(63) Continuation of application No. 13/698,129, filed as application No. PCT/CA2011/050311 on May 18, 2011, now Pat. No. 10,196,289.

(Continued)

(51) Int. Cl.
*C02F 9/00* (2006.01)
*C01F 11/22* (2006.01)
(Continued)

(52) U.S. Cl.
CPC .............. *C02F 9/00* (2013.01); *B01D 61/022* (2013.01); *B01D 61/04* (2013.01); *C01B 25/26* (2013.01);
(Continued)

(58) Field of Classification Search
None
See application file for complete search history.

(56) References Cited

U.S. PATENT DOCUMENTS 3,551,332 A    12/1970    Baumann et al.
3,700,415 A    10/1972    Koerner et al.
(Continued)

FOREIGN PATENT DOCUMENTS

CA    1045258    12/1978
CA    2463781 A1    3/2004
(Continued)

OTHER PUBLICATIONS

Kennedy, G.A. et al., "Chemistry of Gypsum Pond Systems", Florida Institute of Phosphate Research (FIPR) Project #85-05-025R, 1991.

(Continued)

*Primary Examiner* — Clare M Perrin
(74) *Attorney, Agent, or Firm* — Oyen Wiggs Green & Mutala LLP

(57) ABSTRACT

A method for treating, and recovering phosphate compounds from, phosphate-containing wastewater. The method includes the steps of: (a) removing fluoride from the wastewater; (b) recovering a phosphate compound from the wastewater by maintaining supersaturation conditions for the phosphate compound; and (c) polishing the wastewater. A silica removal step may be optionally performed after step (a) and before step (b).

14 Claims, 6 Drawing Sheets

Related U.S. Application Data

(60) Provisional application No. 61/346,002, filed on May 18, 2010.

(51) Int. Cl.

| | | |
|---|---|---|
| *C01B 25/26* | (2006.01) | |
| *B01D 61/04* | (2006.01) | |
| *C01B 25/45* | (2006.01) | |
| *B01D 61/02* | (2006.01) | |
| *C02F 1/52* | (2006.01) | |
| *C02F 101/10* | (2006.01) | |
| *C02F 101/14* | (2006.01) | |
| *C02F 101/16* | (2006.01) | |
| *C02F 3/30* | (2006.01) | |
| *C02F 1/66* | (2006.01) | |
| *C02F 1/44* | (2006.01) | |
| *C02F 1/20* | (2006.01) | |
| *C02F 103/00* | (2006.01) | |
| *C02F 1/76* | (2006.01) | |
| *C02F 1/42* | (2006.01) | |

(52) U.S. Cl.
CPC ............ *C01B 25/45* (2013.01); *C01F 11/22* (2013.01); *C02F 1/52* (2013.01); *C02F 1/5236* (2013.01); *B01D 2311/04* (2013.01); *B01D 2311/06* (2013.01); *C02F 1/20* (2013.01); *C02F 1/441* (2013.01); *C02F 1/442* (2013.01); *C02F 1/66* (2013.01); *C02F 1/76* (2013.01); *C02F 3/302* (2013.01); *C02F 2001/425* (2013.01); *C02F 2101/105* (2013.01); *C02F 2101/14* (2013.01); *C02F 2101/16* (2013.01); *C02F 2103/007* (2013.01); *C02F 2303/16* (2013.01)

(56) References Cited

U.S. PATENT DOCUMENTS

| | | |
|---|---|---|
| 3,725,265 A | 4/1973 | Legal |
| 4,639,359 A | 1/1987 | Michalski et al. |
| 5,294,348 A | 3/1994 | Horny et al. |
| 6,113,797 A | 9/2000 | Al-Samadi |
| 6,258,277 B1 | 7/2001 | Salmen et al. |
| 6,331,256 B1 | 12/2001 | Kezuka et al. |
| 7,491,333 B1 | 2/2009 | Luke et al. |
| 7,560,031 B1 | 7/2009 | Astley et al. |
| 7,622,047 B2 | 11/2009 | Koch et al. |
| 2002/0148790 A1 | 10/2002 | Krulik |
| 2003/0080067 A1 | 5/2003 | Michalski et al. |
| 2003/0196965 A1 | 10/2003 | Haggerty |
| 2006/0196835 A1 | 9/2006 | Shimamura et al. |
| 2007/0256985 A1 | 11/2007 | Zhao et al. |
| 2008/0053909 A1 | 3/2008 | Fassbender |
| 2008/0257826 A1 | 10/2008 | Koch et al. |
| 2010/0322839 A1 | 12/2010 | Chung |
| 2011/0127223 A1* | 6/2011 | Astley .................... C01B 25/22 210/712 |

FOREIGN PATENT DOCUMENTS

| | | |
|---|---|---|
| CN | 1964921 A | 5/2007 |
| GB | 1601669 | 11/1981 |
| KR | 1999011049 A | 2/1999 |
| WO | 2005077834 A1 | 8/2005 |

OTHER PUBLICATIONS

Perpich, B. et al., "Mobile Wastewater Treatment Helps Remediate Concentrated Acidic Process Water at Fertilizer Plant", Florida Water Resources Journal, Jul. 2005.

Kleinschmidt, D., "Phosphogypsum Stack Closure", pp. 185-192, Mar. 16, 2006.

El-Shall, H. et al., "Struvite—A Possible Solution to the High-Mag Rock?", Materials Science and Engineering Department Particle Engineering Research Center, University of Florida, Sep. 26, 2002.

Wissa, A.E.Z., "Phosphogypsum Disposal", http://www.fipr.state.fl/us/pondwatercd/phosphogypsum_disposal1.htm, May 10, 2010.

Tong, J. et al., "Resent advances in phosphorus removal with struvite formation", Chemical Industry and Engineering Progress, 2007, vol. 26, No. 4, 526-530.

Ryu et al., "Application of struvite precipitation in treating ammonium nitrogen from semiconductor wastewater", Journal of Hazardous Materials, 2008, 156, 163-169, Elsevier.

* cited by examiner

TREATMENT OF PHOSPHATE-CONTAINING WASTEWATER

TECHNICAL FIELD

This application claims the benefit under 35 U.S.C. § 119 of U.S. provisional patent application No. 61/346,002, which is hereby incorporated herein by reference.

TECHNICAL FIELD

The invention relates to treatment of phosphate-containing wastewater, such as phosphogypsum pond water, and the recovery of useful phosphate compounds, such as struvite, during treatment.

BACKGROUND

Phosphogypsum is a by-product of processing phosphate rock into phosphoric acid fertilizer. The production of 1 ton of phosphoric acid generates approximately 4 to 5 tonnes of phosphogypsum. Phosphogypsum is essentially a waste product. Phosphogypsum may have low level radioactivity which prevents its use in various applications.

Phosphogypsum is typically stored by being slurried and piled into large stacks, which can be up to hundreds of feet high, in open air storage sites. Water percolating through the stacks forms ponds. In 2005, there were 24 phosphogypsum stacks in Florida alone, containing 1.2 billion tonnes of phosphogypsum and 50 billion gallons of pond water (Perpich et al, 2005).

In active phosphoric acid fertilizer plants, such ponds are typically used as reservoirs for process water for use in a closed loop. The pond water is toxic and needs to be treated before it can be discharged. Furthermore, closed stacks continue to produce a contaminant-containing leachate requiring treatment.

Pond water associated with phosphogypsum stacks is strongly acidic and contains numerous contaminants including large amounts of phosphates. Data collected from a number of sources are summarized in Table 1. The column headed "Representative Value" contains results from a composite of 18 samples from 6 different plants representing the composition of saturated fresh pond water (Kennedy et al., 1991). The reported phosphorus concentration of 6,600 ppm as P is equivalent to 20,220 ppm $PO_4$ or 0.22 Mol/L. Pond water also contains significant amounts of ammonia (ammonia is often added to phosphoric acid in phosphoric acid plants to make di-ammonium phosphate) and magnesium.

TABLE 1

Typical composition of pond water

| Component | Units | Range | Representative Value |
|---|---|---|---|
| pH | | 1.3-3.0 | 1.55 |
| Conductivity | µS/cm | 15,000-30,000 | |
| Ammonia (as N) | ppm | 500-2,000 | 592 |
| Calcium | ppm | 500-3,000 | 1,155 |
| Chloride | ppm | 10-300 | |
| Fluoride | ppm | 200-15,000 | 7,600 |
| Iron | ppm | 5-300 | 216 |
| Magnesium | ppm | 200-500 | 286 |
| Phosphorus (as P) | ppm | 500-12,000 | 6,600 |
| Potassium | ppm | 100-400 | 276 |
| Silica (as Si) | ppm | 100-4,000 | 1,910 |
| Sodium | ppm | 1,000-3,000 | 1,995 |
| Sulfate (as S) | ppm | 1,000-4,000 | 1,695 |

Pond water treatment chemistry is relatively complex. Pond water may contain ten major components that can form numerous soluble species and precipitates when the pH is changed and cations are added. As indicated by the data under the column headed "Range" in Table 1, the composition of pond water can vary significantly.

A cost-effective and efficient process for treating phosphate-containing wastewater while recovering commercially useful phosphate compounds would be desirable.

SUMMARY

The following embodiments and aspects thereof are described and illustrated in conjunction with apparatus and methods which are meant to be exemplary and illustrative, not limiting in scope. In various embodiments, one or more of the above-described problems have been reduced or eliminated, while other embodiments are directed to other improvements.

In one aspect, a method for treating, and recovering phosphate compounds from, phosphate-containing wastewater, is provided. The method comprising: (a) removing fluoride from the wastewater; (b) recovering a phosphate compound from the wastewater by maintaining supersaturation conditions for the phosphate compound; and (c) polishing the wastewater.

Step (a) may comprise precipitating the fluoride. Precipitating the fluoride may comprise raising the pH of the wastewater to about pH 3 to 4. Raising the pH of the wastewater may comprise adding a calcium-containing base with calcium in a quantity to meet stoichiometric requirements for precipitating the fluoride. The calcium-containing base may be lime. The fluoride may be precipitated as fluorite. Raising the pH of the wastewater further may comprise adding one or more calcium-free bases with cations in a quantity to meet stoichiometric requirements for precipitating the phosphate compound. The one or more calcium-free bases may be selected from the group consisting of magnesium, oxide, magnesium hydroxide, ammonium hydroxide and anhydrous ammonia.

The phosphate compound may comprise struvite or a struvite analog such as iron ammonium phosphate.

Maintaining supersaturation conditions in step (b) may comprise one or more of maintaining a supersaturation ratio of 2 to 5; maintaining a pH of at least about pH 5; controllably introducing magnesium and/or ammonium; and maintaining a concentration of phosphate higher than concentrations of magnesium and ammonia. The struvite may be recovered in the form of crystals and aggregates ranging in size from 1 to 5 mm.

Silica may be removed from the wastewater of step (a) if the wastewater from step (a) comprises a silica concentration of greater than 100 ppm. Removing silica may comprise hydrolyzing the silica by raising the pH. Raising the pH to hydrolize the silica may comprise adding a base comprising cations in a quantity to meet stoichiometric requirements for precipitating the phosphate compound. The base may be selected from the group consisting of magnesium oxide, magnesium hydroxide, ammonium hydroxide and anhydrous ammonia.

Polishing step (e) may comprise raising the pH to about pH 8 to 10. Step (c) may comprise removing ammonia using a process selected from the group consisting of breakpoint chlorination, stripping, biological nitrification and biological denitrification.

Polishing step (c) may comprise subjecting the wastewater from step (b) to a two-stage membrane treatment comprising; (i) a first membrane treatment to obtain a first concentrate comprising divalent ions and a first permeate comprising monovalent ions; and (ii) a second membrane treatment for the first permeate to obtain a second concentrate comprising monovalent ions and a second permeate comprising effluent. The first concentrate may be recirculated to step (a). The first membrane treatment may comprise nanofiltration. The second membrane treatment may comprise reverse osmosis. Prior to the two-stage membrane treatment, the pH may be lowered to about pH 3 to 5, and suspended solids may be removed by filtration. Ammonia may be removed from the second permeate by subjecting the second permeate to ion exchange. Ammonia-containing regeneration liquid of the ion exchange may be recirculated to step (b).

Prior to step (b) the wastewater may be subjected to a first membrane treatment to obtain a first concentrate comprising divalent ions and a first permeate comprising monovalent ions, wherein the first concentrate defines feed for step (b). Wastewater from step (b) may be recirculated to step (a). The first permeate may be subjected to a second membrane treatment to obtain a second concentrate comprising monovalent ions and a second permeate comprising effluent. The first membrane treatment may comprise nanofiltration. The second, membrane treatment may comprise reverse osmosis. Prior to the two-stage membrane treatment, the pH may be lowered to about pH 3 to 5, and suspended solids may be removed by filtration. Ammonia may be, removed from the second permeate by subjecting the second permeate to ion exchange. Ammonia-containing regeneration liquid of the ion exchange may be recirculated to step (b).

In addition to the exemplary aspects and embodiments described above, further aspects and embodiments will become apparent by reference to the drawings and by study of the following detailed descriptions.

BRIEF DESCRIPTION OF THE DRAWINGS

The accompanying drawings illustrate non-limiting embodiments of the invention.

DESCRIPTION

Throughout the following description, specific details are set forth in order to provide a more thorough understanding of the invention. However, the invention may be practiced without these particulars. In other instances, well-known elements have not been shown or described in detail to avoid unnecessarily obscuring the invention. Accordingly, the specification and drawings are to be regarded in an illustrative, rather than a restrictive, sense.

Some embodiments of the invention relate to methods for treating phosphate-containing wastewater while simultaneously recovering commercially useful phosphate compounds. Bases are used to neutralize the acidity of phosphate-containing wastewater. Cations from the bases are used to remove contaminants and recover phosphate compounds. Excess cations may be recirculated to maximize contaminant removal and recovery of phosphate compounds.

Some embodiments of the invention relate to treatment processes wherein the phosphate-containing wastewater is phosphogypsum pond water and the phosphate compound is recovered in the form of granular struvite. These embodiments coincide with an aspect of the invention having significant commercial utility. The scope of the invention, however, is not limited to these embodiments.

Figure 1:
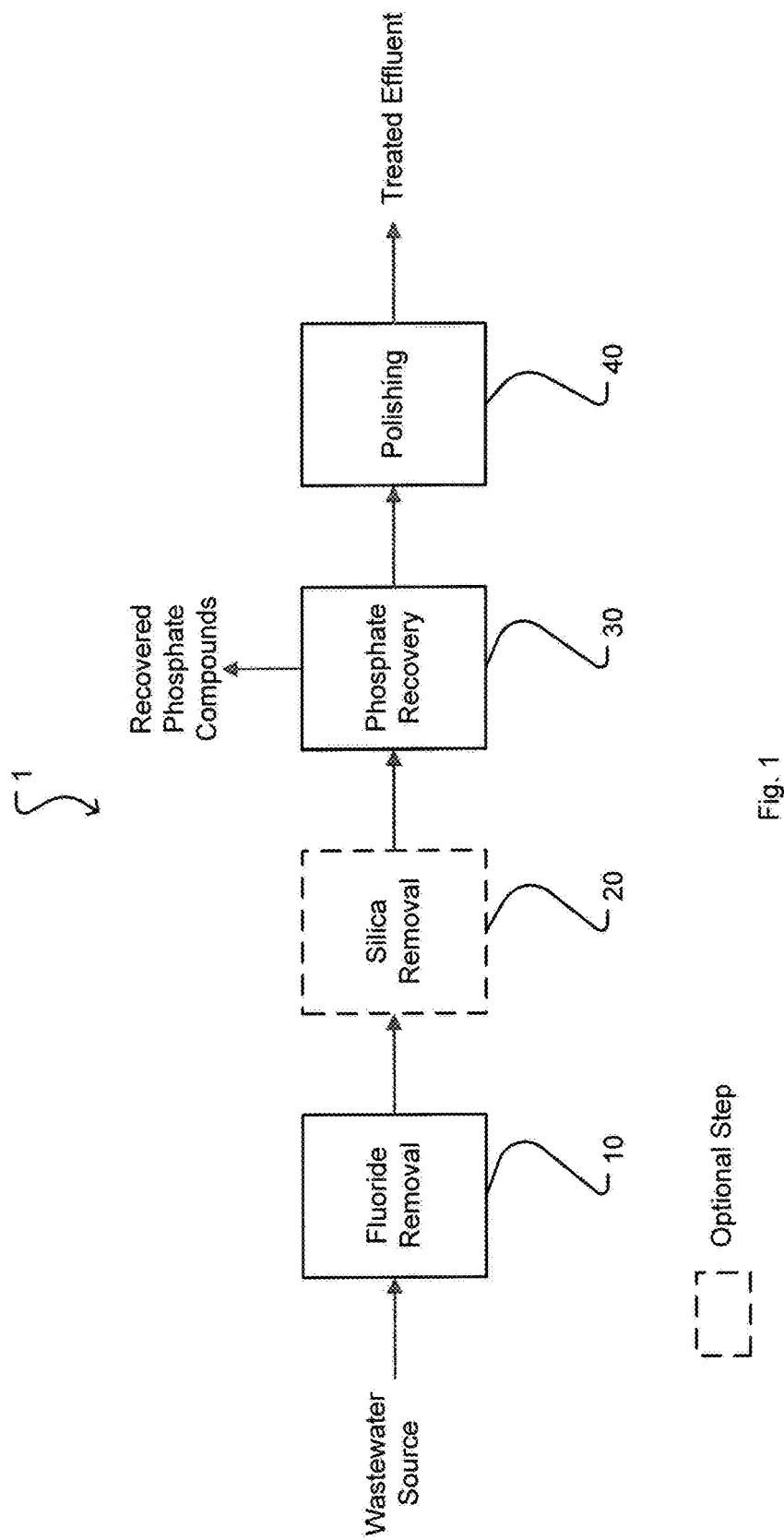
FIG. 1 is a flowchart illustrating a process for treating phosphate-containing wastewater according to one embodiment of the present invention.

FIG. 1 illustrates in a general manner a wastewater treatment process 1 according to one embodiment of the invention. In process 1, phosphate-containing wastewater from a wastewater source undergoes a fluoride removal step 10 an optional silica removal step 20, a phosphate recovery step 30, and a polishing step 40. The wastewater may for example be phosphogypsum pond water. Phosphate recovery step 30 yields phosphate compounds in a commercially useful form. Polishing step 40 yields treated effluent ready for discharge.

Figure 2:
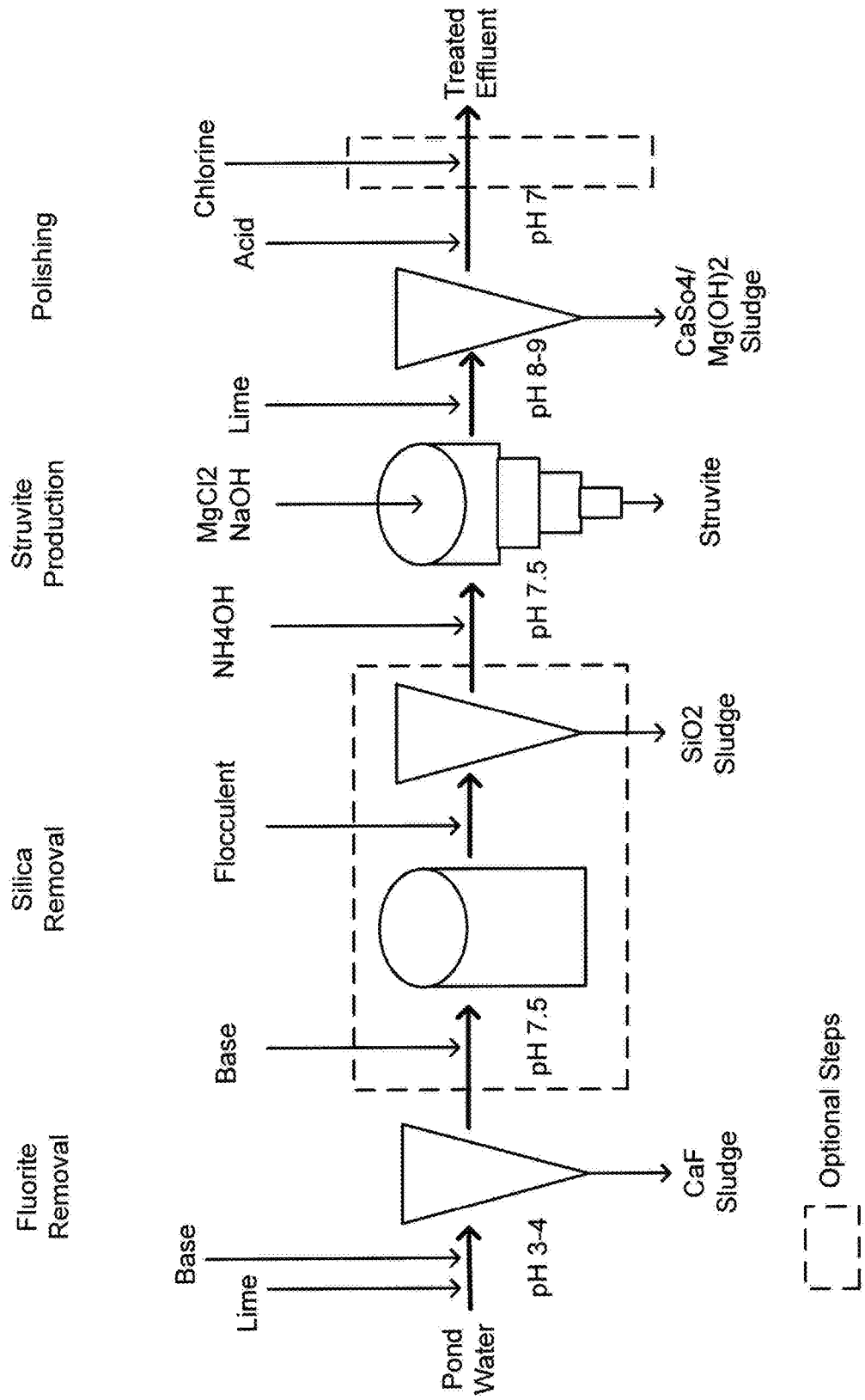
FIG. 2 is a block diagram illustrating a process for treating phosphate-containing wastewater according to another embodiment of the present invention.

FIG. 2 illustrates another embodiment of the invention following process 1 but more specifically exemplifying treatment of phosphogypsum pond water and recovery of struvite.

Fluoride removal step 10 comprises raising the pH of the wastewater with one or more bases to a desired pH that promotes precipitation of contaminants such as fluoride and/or sulphates but not precipitation of phosphates. In some embodiments the pH may be raised to about pH 3.0-4.0. in some embodiments the degree to which the pH is raised may vary with the composition of the wastewater. Fluoride removal step 10 results in relatively dense precipitates that settle well. The precipitates may for example be settled and separated in a pond, a clarifier, a separation tank, or the like.

The base used in fluoride removal step 10 may be a calcium-containing base. The calcium-containing base may be added in an amount such that the calcium added to any pre-existing calcium in the wastewater results in a concentration of calcium ions sufficient to cause precipitation of compounds such as fluorite, calcium fluorosilicate, calcium sulphate, and the like while being insufficient to precipitate significant amounts of calcium phosphate. This may be achieved by adding sufficient calcium into the wastewater solution at a rate such that the product of the calcium ion concentration, the concentration of a fluorine-containing ionic species and the concentrations of any other components of a calcium salt exceeds the $k_{sp}$ for the calcium salt without being so high as to cause significant precipitation of calcium phosphate. The total amount of calcium added in step 10 is desirably sufficient to cause precipitation of the bulk of the fluoride in the wastewater in step 10. For example, a stoichiometric amount of calcium may be introduced during step 10. As shown in FIG. 2, the calcium-containing base may comprise lime, including calcium oxides, carbonates and hydroxides. In other embodiments, the calcium-containing base may be a compound other than lime.

Alternatively or additionally, one or more calcium-free bases may be added to raise the pH sufficiently to precipitate the fluoride at fluoride removal step 10. In some embodiments, the calcium-free base may be selected on the basis of a phosphate compound that is desired to be recovered at phosphate recovery step 30. For example, if the phosphate compound to be recovered is or comprises struvite, as shown in FIG. 2, suitable calcium-free bases may include magnesium- and/or ammonium-containing bases such as magnesium oxide, magnesium hydroxide, ammonium hydroxide and anhydrous ammonia.

Bases containing, magnesium and/or ammonia may be added to simultaneously raise pH of the wastewater and increase the concentration of magnesium and/or ammonia cations to facilitate struvite production in a subsequent step. For example, magnesium oxide may be used to add magnesium in a quantity sufficient to raise a concentration of magnesium ions to or toward a concentration desired to later precipitate struvite. Addition of a magnesium-containing base may also assist in removal of fluoride ions by promoting precipitation of fluoride as sellaite ($MgF_2$).

In some embodiments a mixture of two or more calcium-free bases may be used, to raise the pH at fluoride removal step 10. Bases may be added in a sequence that accounts for pH-dependent differences in solubility of the bases. For example, the base with better dissolution at a lower pH may be added before the base with lower dissolution at the lower pH. For example, if magnesium oxide and ammonium hydroxide are used, then magnesium oxide may be added first (because its dissolution is better at lower pH), and then ammonium hydroxide added next to reach the desired pH for fluoride removal.

Following fluoride removal step 10, process 1 may include a silica removal step 20. Silica removal may be desirable in some embodiments to avoid silica gel formation, which may interfere with recovery of phosphate compounds (e.g. struvite crystallization) at phosphate recovery step 30. In some embodiments, silica may be removed by adding base to hydrolyze the silica and then allowing, the silica to settle. Step 20 may conveniently be performed in a settling tank or the like. Settled silica may be removed. In some embodiments, silica may be hydrolyzed by adding a base to adjust the to pH to a pH optimal for subsequent phosphate recovery step 30. In some embodiments, the pH may be at least about 5 prior to phosphate recovery step 30.

One or more bases that contain cations (e.g. magnesium and/or ammonia) that will enhance phosphate precipitation at phosphate recovery step 30 may be used to raise the pH for silica removal step 20. As shown in FIG. 2, the pH may be raised to a pH of about 7.5 in silica removal step 20. In some embodiments a suitable flocculent may be added after silica hydrolysis to further promote aggregation and, settling of the silica.

Silica removal step 20 is unnecessary in some embodiments. Since silica gel formation tends to occur only at higher silica concentrations (e.g. Si>100 ppm), embodiments of the invention for processing wastewater with low silica concentrations may not require the silica removal step. Even if the silica concentration is high enough for gel formation, the hydraulic retention time of the gel formation is typically on the order of hours. In contrast, the hydraulic retention time for phosphate precipitation at phosphate recovery step 30 may be shorter than this. For example, the hydraulic retention time for struvite formation is typically less than 1 hour, although with a high concentration feed the hydraulic retention time may be significantly longer in embodiments incorporating recirculation as described below. Silica gel formation and the need for silica removal prior to phosphate recovery step 30 may therefore be avoided even in some embodiments that process wastewater with higher silica concentrations. In some embodiments where silica is not removed prior to phosphate recovery step 30, silica is hydrolyzed during phosphorus recovery step 30 and eventually removed downstream.

Silica removal step 20 is followed by phosphate recovery step 30. As shown in FIG. 2, phosphate may in some embodiments be recovered in the form of struvite, struvite analogs, or other phosphate compounds, for example according to the methods and apparatus described by Koch et al. in U.S. Pat. No. 7,622,047, incorporated herein by reference. lithe wastewater was not treated by silica removal step 20 (and therefore the pH not raised since fluoride removal step 10), then a suitable base may be added to the wastewater at an initial point of phosphate recovery step 30 to raise the pH to a desired level for precipitating the desired phosphate compound(s). As shown in FIG. 2, ammonium hydroxide (or other ammonium and/or magnesium containing base) may for example be used to raise the pH for phosphate recovery step 30 to raise the pH. The pH may be raised to between pH 7.0 to 8.0, for example to pH 7.5.

Supersaturation conditions for the phosphate compound are maintained to recover desired phosphate compounds during phosphate recovery step 30. Maintaining supersaturation conditions may for example include: maintaining a supersaturation ratio of 2 to 5 for struvite; maintaining a suitable pH for example by controllably introducing a base and/or air stripping; maintaining phosphate concentration higher than concentrations of other components of the phosphate compound; and/or controllably introducing compounds comprising at least one of the other components of the desired phosphate compound.

Supersaturation conditions for struvite may be determined in relation to the struvite solubility product $K_{sp}$ given by:

$$K_{sp}=[Mg^{2+}]_{eq}[NH_4^+]_{eq}[PO_4^{3-}]_{eq}$$

where the activities of the different species (i.e. $[Mg^{2+}]_{eq}$, $[NH_4^+]_{eq}$, and $[PO_4^{3-}]_{eq}$) are measured respectively as soluble magnesium, ammonia and orthophosphate at equilibrium. The supersaturation ratio (SSR) may be given by:

$$SSR=[Mg^{2+}][NH_4^+][PO_4^{3-}]/K_{sp},$$

Increases in the SSR drive crystallization of struvite.

In the case of struvite recovery, the "other components" mentioned above are magnesium and ammonia. During struvite recovery in the embodiment illustrated in FIG. 2, sodium hydroxide is added to control pH and magnesium chloride is added to control magnesium concentration. Struvite recovery may be "run lean" on magnesium and/or ammonia in sonic embodiments. Struvite may be recovered in the form of solid pellets ranging in size from 1 to 5 mm in some embodiments.

The methods described in U.S. Pat. No. 7,622,047 may be modified and/or selected to optimize phosphate recovery step 30 in various ways including one or more of the following.

i. The hydraulic retention time during struvite recovery may be extended since phosphogypsum pond water tends to have a much higher concentration of phosphorus compared to municipal wastewater and pellet formation is rate limiting. This may be achieved, for example, by increasing a recycling ratio (a proportion of wastewater that is recycled to wastewater that exits phosphate recovery step 30).

ii Ammonia may be added in the form of ammonium hydroxide (or alternatively as anhydrous ammonia or ammonium chloride plus caustic for pH adjustment).

iii. The flow rate of the phosphogypsum pond water feed may be decreased relative to the flow rate of wastewater being recycled in phosphate removal step 30 to achieve the desired supersaturation ratio of 2-5.

iv. Phosphate may be kept in excess so as to minimize the amounts of magnesium and ammonium lost in the final effluent Following phosphate recovery step 30 the wastewater undergoes polishing step 40 before being discharged as treated effluent. In some embodiments, polishing step 40 may involve one or more chemical treatment steps.

In the embodiment shown in FIG. 2, polishing step 40 includes raising the pH of the wastewater from the struvite production step to about pH 8-10. This may comprise adding a base such as lime. The elevated pH causes precipitation of remaining solutes including any phosphate, sulphate, calcium, magnesium, and trace heavy metals. Polishing step 40 may also include an ammonia removal step. As shown in FIG. 2, ammonia may be removed by lowering the pH to about pH 7.0 and subjecting the wastewater to breakpoint chlorination. Other suitable methods of removing ammonia include stripping, biological nitrification, biological denitrification, and the like. The ammonia removal step may not be needed if the struvite recovery step is run lean on ammonia. After polishing step 40, the treated effluent may be discharged.

Figure 3:
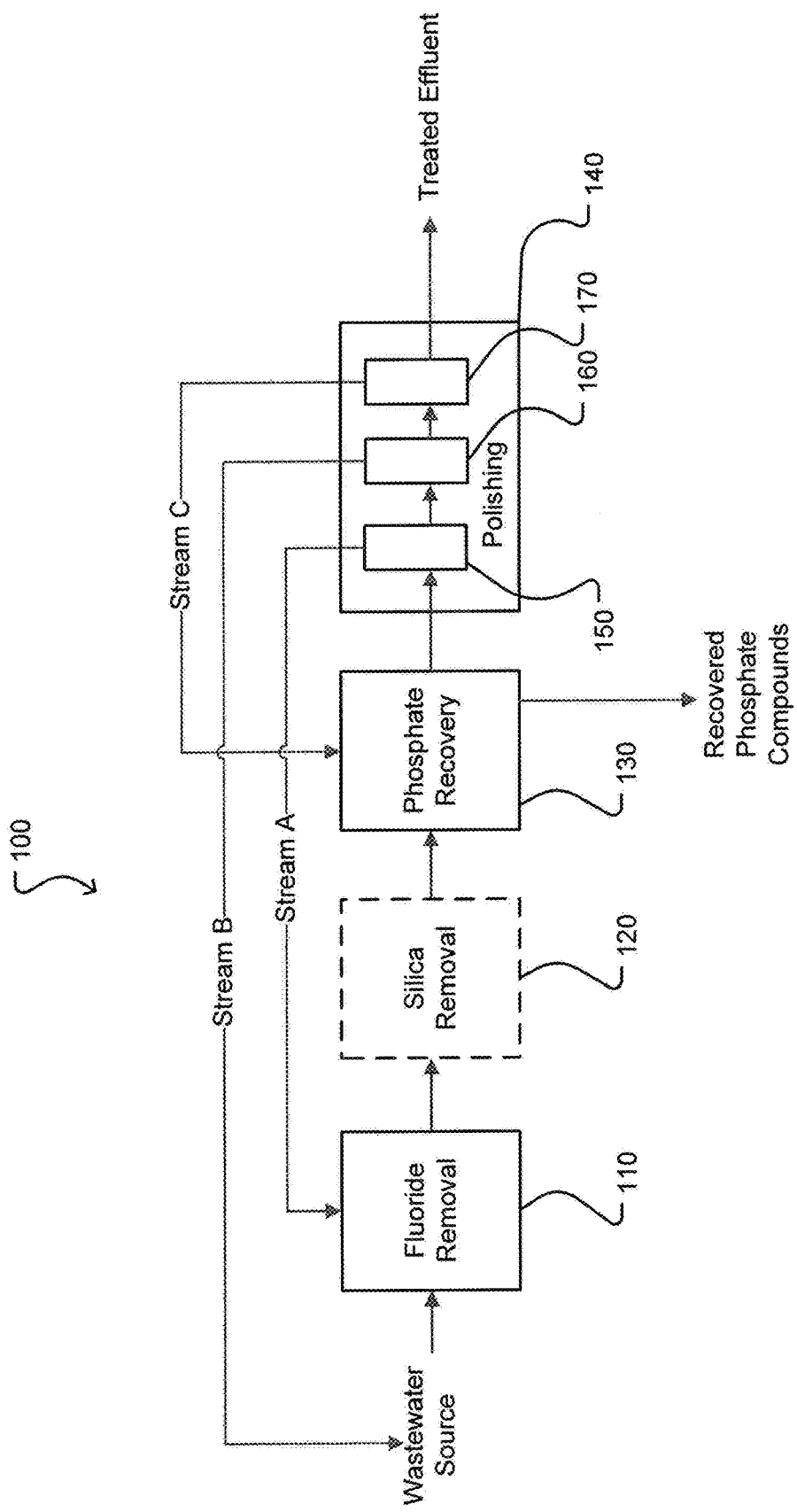
FIG. 3 is a flowchart illustrating a process for treating phosphate-containing wastewater according to one embodiment of the present invention.

FIG. 3 illustrates in a general manner a wastewater treatment process 100 according to another embodiment of the invention. Fluoride removal step 110, silica removal step 120, and phosphate recovery step 130 of process 100 may be similar to the corresponding steps of process 1.

Figure 4:
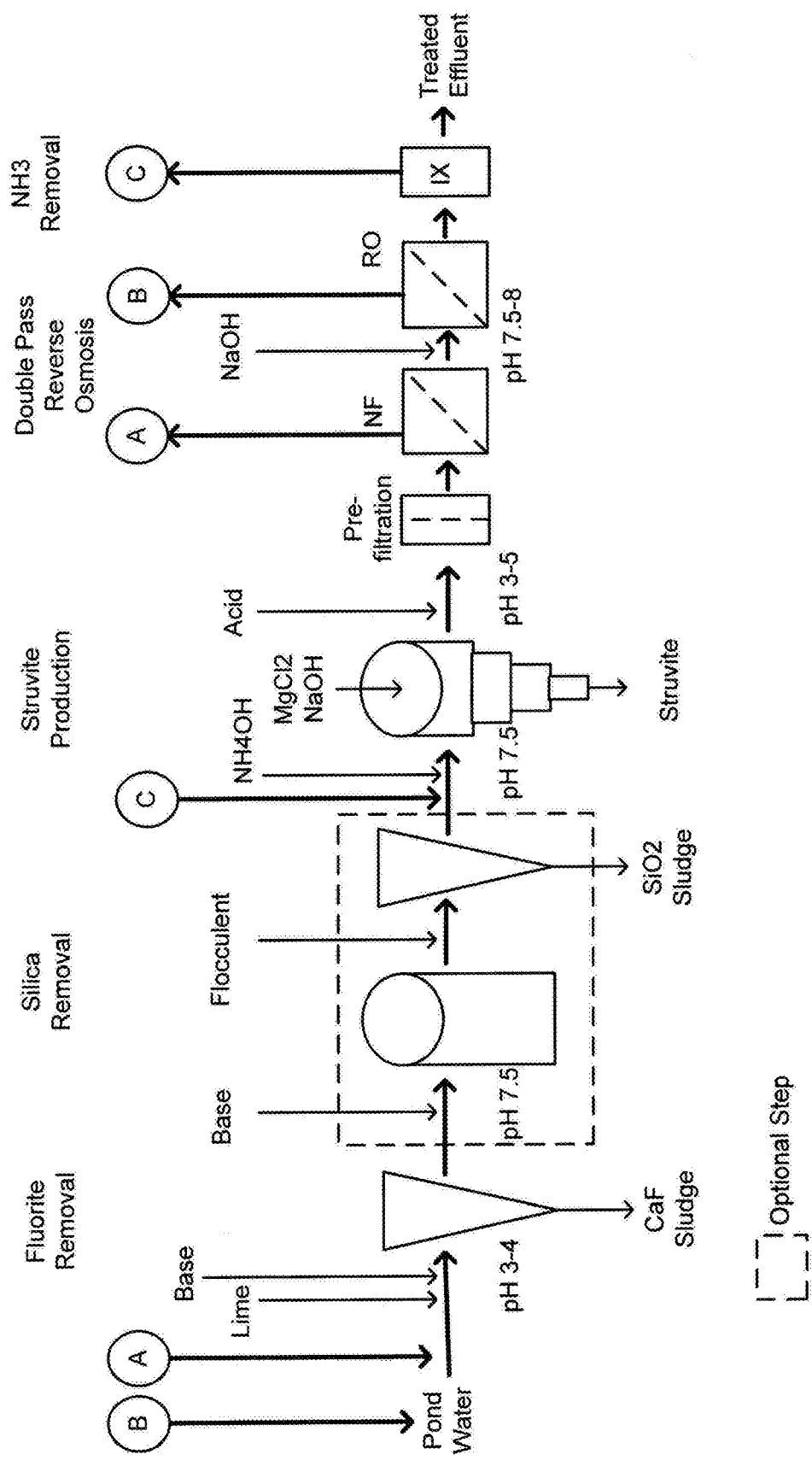
FIG. 4 is a block diagram illustrating a process for treating phosphate-containing wastewater according to another embodiment of the present invention.

FIG. 4 illustrates a further embodiment of the invention following process 100 but more specifically exemplifying treatment of phosphogypsum pond water and recovery of struvite. Following phosphate recovery step 130, wastewater in process 100 is polished by membranes 150, 160 at polishing step 140. As shown in FIG. 4, prior to membrane treatment the pH of the wastewater may he lowered to about pH 3.0-5.0 to avoid scaling of the membranes, as well as to reduce silica hydrolysis and the risk of membrane fouling. This can be particularly desirable in cases where a silica removal step is, not performed upstream. Prior to membrane treatment the wastewater may be pre-filtered to remove suspended solids and to reduce the silt density index. Lowering pH and/or pre-filtration prior to membrane treatment are optional in some embodiments.

First stage membrane 150 may be configured to reject divalent ions (e.g. phosphate, sulphate, magnesium) and let monovalent ions flow through (e.g. sodium, chloride, fluoride, ammonia) to second stage membrane 160. The first stage membrane may for example comprise a reverse osmosis (RO) or nanofiltration (NF) membrane. In some embodiments, the low pH concentrates (stream A) from first stage membrane 150 may be recirculated to fluoride removal step 110. As shown in FIG. 4, recirculation of stream. A diverts divalent ions from discharge and instead results in: further precipitation of waste components at the fluoride removal step (e.g. removal of sulphate as calcium sulphate at the fluoride removal step); and further recovery of desired components (e.g. phosphate and the magnesium as struvite) at the phosphate recovery step.

Second stage membrane 160 may be configured to reject monovalent ions (e.g. sodium, chloride, fluoride). As shown in FIG. 4, the second stage membrane may comprise a reverse osmosis (RO) membrane. The pH of the permeate from the first stage membrane may be adjusted up to pH 7.5-8.0 before the second stage membrane to promote rejection of fluoride and obtain permeate that can be discharged directly. In some embodiments, the second stage membrane concentrates (stream B) containing mostly monovalent ions (sodium, chloride, fluoride) may be delivered back to the wastewater source (e.g. phosphogypsum stack) or to the fluoride removal step.

An ion exchange (IX) resin bed 170 may be provided to remove ammonia from the second stage membrane permeate before discharge as treated effluent. Ion exchange regeneration liquid containing the ammonia (stream C) may be recirculated to phosphate recovery step 130 to provide pH adjustment and ammonia for recovery of phosphate compounds.

Figure 5:
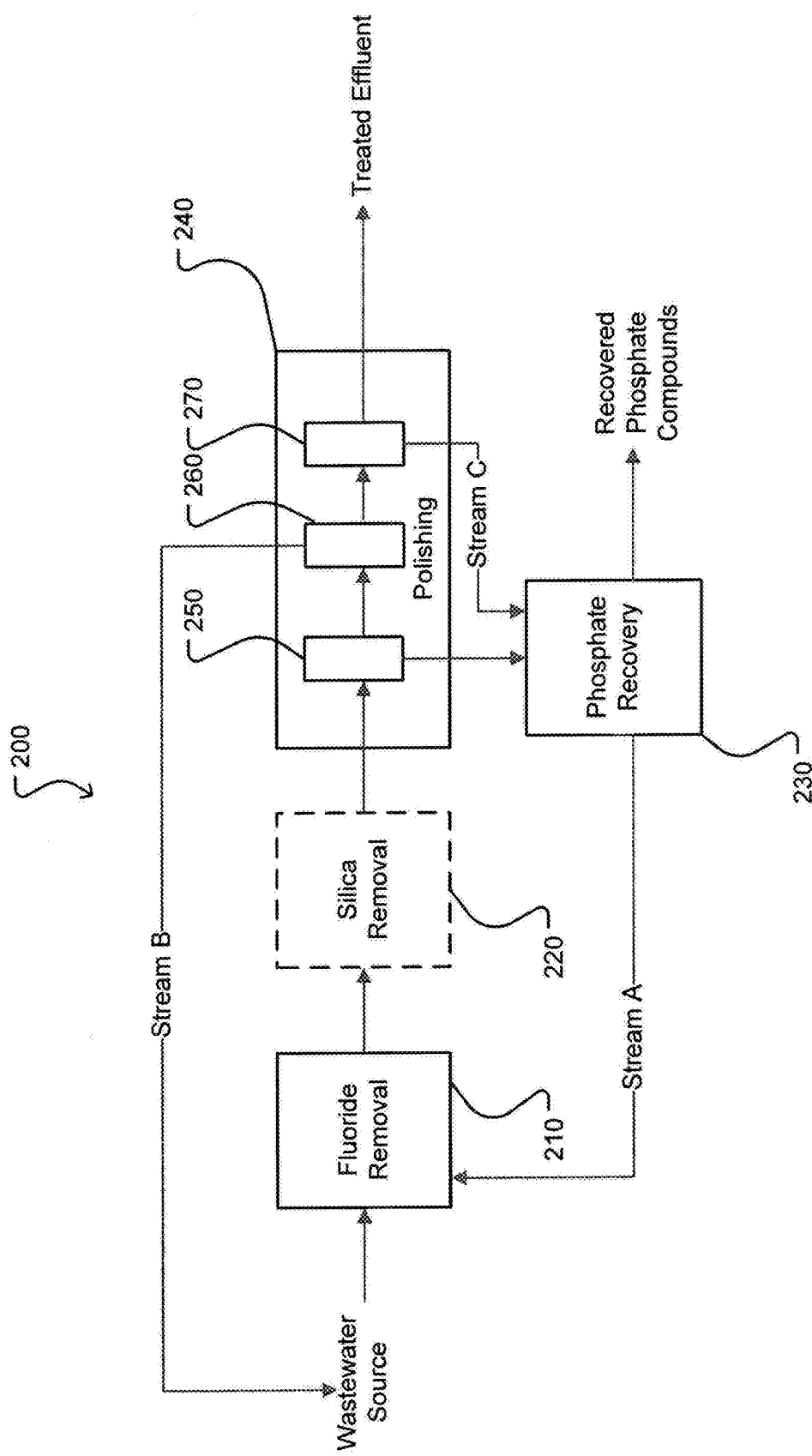
FIG. 5 is a flowchart illustrating a process for treating phosphate-containing wastewater according to one embodiment of the present invention.
Figure 6:
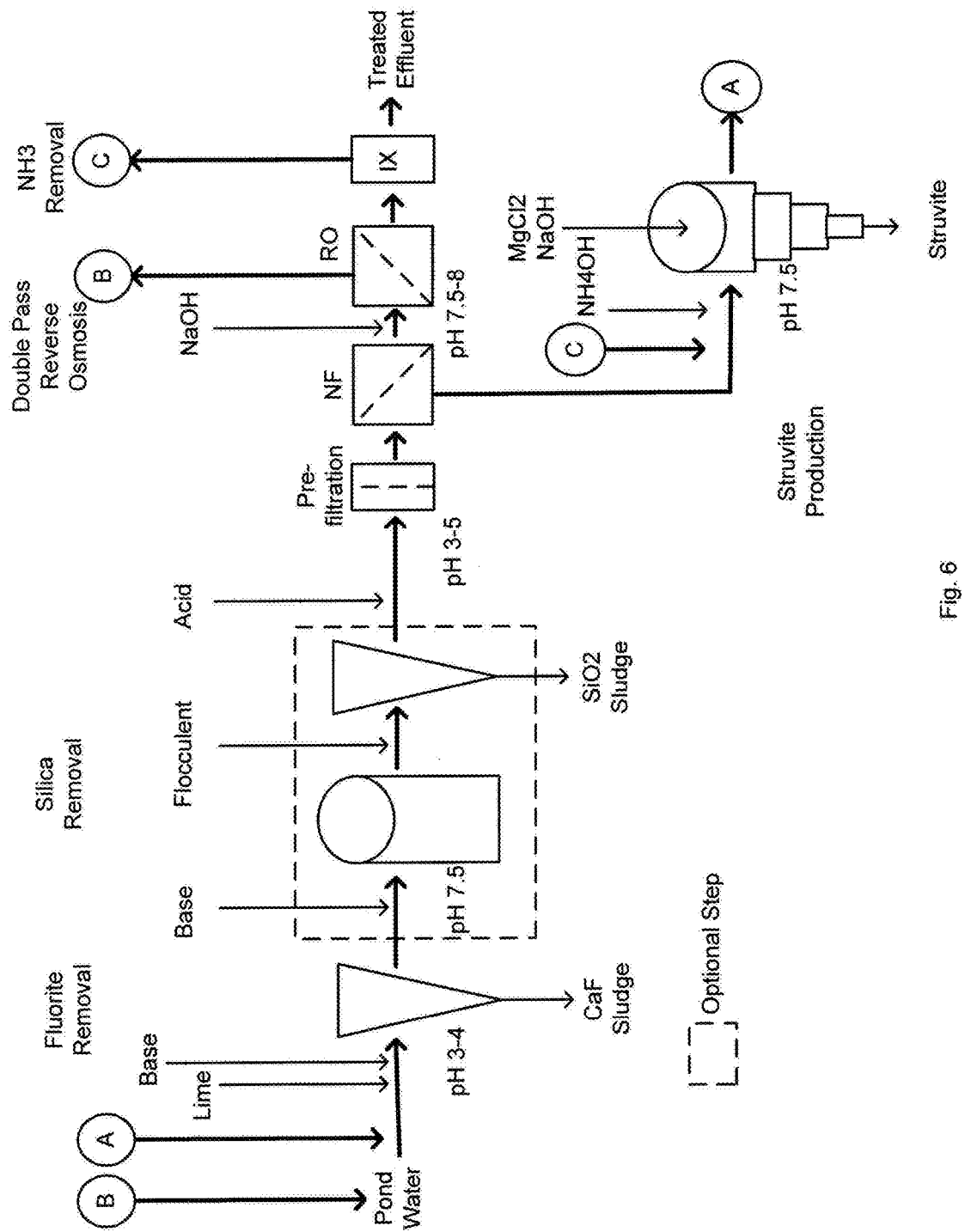
FIG. 6 is a block diagram illustrating a process for treating phosphate-containing wastewater according to another embodiment of the present invention.

FIG. 5 illustrates in a general manner a wastewater treatment process 200 according to another embodiment of the invention. Fluoride removal step 210, silica removal step 220, and phosphate recovery step 230 of process 200 are similar to the corresponding steps of process 1, and first stage membrane 250, second stage membrane 260, and ion exchange resin bed 270 are similar to the corresponding features of process 100. FIG. 6 illustrates a further embodiment of the invention following process 200 but more specifically exemplifying treatment of phosphogypsum pond water and recovery of struvite.

Following silica removal step 220, wastewater is directed first stage membrane 250. In a mariner similar to process 100, the wastewater may be acidified and prefiltered prior to first stage membrane 250. Concentrate from the first stage membrane is fed to phosphate recovery step 230. This concentrate may contain most of the phosphate at about twice the concentration compared to the feed for the phosphate recovery steps in process 1 and 100. Concentrated phosphate may improve the conditions for the recovery of phosphate compounds in some cases. The other elements of the processes illustrated in FIGS. 5 and 6, including the three recirculation streams A, B and C, are similar to those described above in relation to process 100, with the exception that in, process 200 stream A is generated at the phosphate recovery step instead of as concentrate of the first stage membrane in process 100.

Recirculation of concentrate streams A, containing for example excess magnesium, and concentrate stream C, containing for example excess ammonia, to upstream steps may result in up to complete recovery of these components into recovered phosphate compounds, for example as struvite.

As will be apparent to those skilled in the art in the light of the foregoing disclosure, many alterations and modifications are possible in the practice of this invention without departing from the spirit or scope thereof. For example:

i. The methods for ammonia removal described for the ammonia removal step of process 1 and the ion exchange method for ammonia removal in processes 100 and 200 are interchangeable.

ii. Process 1 may be modified to provide recirculation. For example ammonia recovered at the ammonia removal step may be recirculated to phosphate recovery step 30.

iii. The two-stage membrane treatment may be substituted with a single membrane (e.g. reverse osmosis only) or more than two membranes (e.g. the two-stage membrane treatment preceded by microfiltration and/or ultrafiltration membranes).

iv. Individual features of the various embodiments disclosed herein may be combined with one another to create further example embodiments. For example, polishing stage 40 of FIG. 1 may be expanded to comprise membrane treatment, as shown in FIG. 3 or FIG. 4 or other mechanical polishing processes.

v. Some embodiments may produce struvite analogs such as iron ammonium phosphate, wherein corresponding Fe compounds are substituted for Mg compounds during processing.

The following example provides results of laboratory scale testing of some embodiments of the invention.

EXAMPLE 1

Raw pond water samples were tested in three stages: 1) F removal with Ca, 2) pH increase, and 3) struvite precipitation.

In Stage 1, $CaCO_3$ and $Ca(OH)_2$ were added to 2 L and 3 L samples of pond water, mixed for 60 minutes, settled for 30 minutes, then filtered and supernatants analyzed to evaluate the effect of adding the bases on both pH and the concentrations of F and $PO_4$. $Ca(OH)_2$ was added in both solid and slurried form (results shown for slurried form only). Ca:F molar ratios of 0.5 and 0.6 for both reagents were tested, respectively representing the stoichiometric amount and a 20% excess amount.

Both $CaCO_3$ and $Ca(OH)_2$ reagents raised the pH to between about 2.5-3.5 after 1 hour of mixing. $CaCO_3$ may be preferred in some embodiments. Test results showed that with $CaCO_3$ the F removal at 0.6 Ca:F molar ratio was lower than with $Ca(OH)_2$ at 0.6 Ca:F molar ratio but so were the $PO_4$ and $NH_3$ losses. For the remaining stages $CaCO_3$ at 0.6 Ca:F molar ratio was used.

24 hours after completion of the test, more solids had precipitated in the filtered supernatant, and the $SO_4$ concentration had decreased along with the Ca concentration, indicating gypsum formation.

TABLE 2

| | Stage 1 results | | | | | |
|---|---|---|---|---|---|---|
| ID | F mg/L | PO4—P mg/L | NH3—N mg/L | SO4—S mg/L | Ca mg/L | pH |
| Pond water | 8800 | 9088.5 | 1215 | 9375 | 1222 | 1.17 |
| J1 0.5 CaCO3 | 7390 | 8262 | 1020 | 2918 | 4701 | 3.04 |
| J2 0.6 CaCO3 | 5197 | 7624 | 1085 | 3192 | 2091 | 3.23 |
| J3 0.5 Ca(OH)2 | 5686 | 7888 | 1024 | 3877 | 2831 | 3.49 |
| J4 0.6 Ca(OH)2 | 4409 | 7517 | 1022 | 7096 | 2616 | 2.66 |
| J1 % removal | 16.0% | 9.1% | 16.0% | 68.9% | | |
| J2 % removal | 40.9% | 16.1% | 10.7% | 66.0% | | |
| J3 % removal | 35.4% | 13.2% | 15.7% | 58.6% | | |
| J4 % removal | 49.9% | 17.3% | 15.9% | 24.3% | | |

In Stage 2, $Mg(OH)_2$ was added On slurried 40 wt % form) to the 500 mL and 1250 mL samples of Stage 1 supernatant in Mg:P molar ratios of 0.8, 0.9, and 1.0, to raise the pH of the solution nearer the pH required for struvite precipitation and also to put Mg ions in solution. Also, $MgCl_2$ was added in 1.0 Mg:P ratio to compare the effects of adding a non-basic Mg source at this stage.

The Mg compounds were added immediately after the completion of a repeated Stage 1 test, to prevent Ca loss through gypsum precipitation. The solutions were mixed for 60 minutes and settled for 15 minutes.

The $Mg(OH)_2$ raised the pH to 4.5-5.5, and caused nearly complete removal (>90%) of both Ca and F. A substantial amount of $PO_4$ was also removed, but the quantity remaining was still high and sufficient for struvite production downstream. A substantial amount of the added Mg was also removed, in this stage. The $MgCl_2$ did not raise the pH but slightly lowered it, and had very little effect on either F removal or P loss. Increasing the Mg:P molar ratio from 0.8 to 1.0 increased F removal by only 2.8% but increased $PO_4$ losses by 11.5%, 0.8 Mg:P was selected for use in Stage 3.

TABLE 3

| | Stage 2 results | | | | | | |
|---|---|---|---|---|---|---|---|
| ID | F mg/L | PO4—P mg/L | NH3—N mg/L | SO4—S mg/L | Ca mg/L | Mg mg/L | pH |
| Pond water | 8800 | 9089 | 1215 | 9375 | 1222 | 551 | 1.17 |
| A 0.6 CaCO3 | 6020 | 7904 | 1152 | 7656 | 5993 | 502 | 3.06 |
| J1 0.8 Mg(OH)2 | 483 | 5421 | 1135 | 7656 | 536 | 2208 | 4.47 |
| J2 0.9 Mg(OH)2 | 370 | 4993 | 1123 | 7656 | 366 | 2234 | 4.86 |
| J3 1.0 Mg(OH)2 | 312 | 4513 | 1068 | 7656 | 230 | 2242 | 5.27 |
| J4 1.0 MgCl2 | 5430 | 7583 | 417 | 8975 | 5995 | 6204.7 | 2.79 |
| A % removal | 31.6% | 13.0% | 5.2% | 18.3% | | 8.9% | |
| J1 % removal | 92.0% | 31.4% | 1.5% | 0% | 91.0% | | |
| J2 % removal | 93.9% | 36.8% | 2.5% | 0% | 93.9% | | |
| J3 % removal | 94.8% | 42.9% | 7.3% | 0% | 96.2% | | |
| 34 % removal | 3.2% | 4.7% | 6.1% | 0% | 0% | | |
| J1 overall removal | 94.5% | 40.4% | 6.6% | 18.3% | | | |
| J2 overall removal | 95.8% | 45.1% | 7.6% | 18.3% | | | |
| J3 overall removal | 96.5% | 50.3% | 12.1% | 18.3% | | | |
| J4 overall removal | 38.3% | 16.6% | 65.7% | 4.3% | | | |

In Stage 3, $NH_4OH$ was added to 500 mL samples of Stage 2 supernatant in N:P molar ratios of 0.8 and 1.0, then NaOH was used to raise the pH above 7.0. As the Mg:P ratio was approximately 0.5:1 due to the Mg loss in Stage 2, a P recovery of near 50% would be expected if the P were primarily forming struvite. The Mg was 99% removed, showing that the reaction proceeded as far as it could given the Mg limits, and the P removal was near 58%. Struvite precipitation in wastewater is Mg limited as well, and $MgCl_2$ or other sources of soluble Mg can be added.

TABLE 4

Stage 3 results:

| ID | F mg/L | PO4—P mg/L | NH3—N mg/L | SO4—S mg/L | Ca mg/L | Mg mg/L | pH | Final pH |
|---|---|---|---|---|---|---|---|---|
| Pond water | 8800 | 9088.5 | 1215 | 9375 | 1222 | 551.1 | 1.17 | |
| J1 0.6 $CaCO_3$ | 5608 | 7957 | 444* | 6099 | 5450 | 496.94 | 3.13 | |
| J2 0.8 $Mg(OH)_2$ | 477 | 5194 | 412 | 8756 | 554.9 | 2080.6 | 4.62 | |
| J3-1 0.8 $NH_4OH$ | 277 | 2190 | 558 | 8948 | 67.6 | 13.158 | 5.52 | 7.40 |
| J3-2 1.0 $NH_4OH$ | 267 | 2150 | 788 | 6729 | 65.7 | 13.0 | 5.84 | 7.36 |
| J1 % removal | 36.3% | 12.4% | 63.5% | 34.9% | | 9.8% | | |
| J2 % removal | 91.5% | 34.7% | 7.2% | 0% | 89.8% | | | |
| J3-1 % removal | 41.9% | 57.8% | | 0% | 87.8% | 99.4% | | |
| J3-2 % removal | 44.0% | 58.6% | | 23.1% | 88.2% | 99.4% | | |
| J3-1 overall removal | 96.9% | 75.9% | | | | | | |
| J3-2 overall removal | 97.0% | 76.3% | | | | | | |

*This number (and the ones below it) are anomalous, and should be similar to the numbers obtained at the end of the Stage 2 test wherein ammonia levels were about 1100 mg/L.

EXAMPLE 2

An overall pH test was also conducted 250 mL of the pond water sample was placed in a beaker. The blade of an overhead mixer was placed in the sample and rotated at 70 rpm 6.95 g $CaCO_3$ was added to obtain a 0.6 Ca:F ratio. The pH was monitored every 15 minutes. The pH was recorded at 60 minutes.

3.95 g $Mg(OH)_2$ slurried in 5.4 g water was added to obtain a 1:1 Mg:P ratio, based on previous jar test results from Example 1. The pH was monitored every 15 minutes. The pH was recorded at 60 minutes.

2.16g dry basis/7.17g 30 wt % $NH_4OH$ was slowly added to obtain a 1:1 $NH_4OH$:P ratio based on P after the $CaCO_3$ precipitation.

TABLE 5 pH test results

| ppt with $CaCo_3$ | | ppt with $Mg(OH)_2$ | | ppt with NH4OH | | |
|---|---|---|---|---|---|---|
| Time (min.) | pH | Time (min.) | pH | Time (min.) | pH | Cum. NH4OH dry basis added |
| 0 | 1.8 | 0 | 3.09 | 0 | 5.17 | 0.54 |
| 15 | 3.2 | 15 | 4.31 | 10 | 5.85 | 1.08 |
| 30 | 3.2 | 30 | 4.77 | 20 | 7.61 | |
| 45 | 3.2 | 45 | 5.03 | 60 | 7.3 | 2.16 |
| 60 | 3.1 | 60 | 5.17 | 120 | 9.49 | |

REFERENCES

Kennedy, G. A., Soroczak, M. M. and Clayton, J. D., "Chemistry of Gypsum Pond Systems", Florida Institute of Phosphate Research (FIPR) Project #85-05-025R, 1991.

Perpich, B, Jr., Soule, C., Zamani Timchak, L., Uebelhoer, G., Nagghappan, L. and Helwick, R., "Mobile Wastewater Treatment Helps Remediate Concentrated Acidic Process Water at Fertilizer Plant" Florida Water Resources Journal, July 2005.

The invention claimed is:

1. A method for treating, and recovering phosphate compounds from, wastewater, the method comprising:
   (a) measuring, precipitating and removing fluoride from the wastewater by raising the pH of the wastewater by adding a calcium-containing base with a stoichiometric amount of calcium to precipitate the fluoride, wherein the pH does not promote precipitation of phosphates, and then further raising the pH of the wastewater by adding one or more calcium-free bases;
   (b) recovering struvite from the wastewater from which fluoride has been removed by maintaining supersaturation conditions for the struvite; and
   (c) polishing the wastewater,
   wherein step (c) comprises subjecting the wastewater from step (b) to a membrane treatment system to obtain a concentrate and a permeate comprising treated effluent.

2. A method according to claim 1 wherein the membrane treatment system comprises a two stage membrane treatment.

3. A method according to claim 2 comprising lowering the pH to about pH 3 to 5 prior to the two stage membrane treatment.

4. A method according to claim 2 comprising removing suspended solids by filtration prior to the two stage membrane treatment.

5. A method according to claim 1 wherein prior to step (b) the wastewater is subjected to a first membrane treatment to obtain a first concentrate comprising divalent ions and a first permeate comprising monovalent ions, wherein the first concentrate defines feed for step (b).

6. A method according to claim 5 wherein wastewater from step (b) is recirculated to step (a).

7. A method according to claim 5 wherein the first permeate is subjected to a second membrane treatment to obtain a second concentrate comprising monovalent ions and a second permeate comprising effluent.

8. A method according to claim 7 wherein the second membrane treatment comprises reverse osmosis.

9. A method according to claim 7 comprising removing ammonia from the second permeate.

10. A method according to claim 9 wherein removing ammonia comprises subjecting the second permeate to ion exchange.

11. A method according to claim 10 wherein ammonia-containing liquid of the ion exchange is recirculated to step (b).

12. A method according to claim 5 wherein the first membrane treatment comprises nanofiltration.

13. A method according to claim 5 comprising lowering the pH to about pH 3 to 5 prior to the first membrane treatment.

14. A method according to claim 5 comprising removing suspended solids by filtration prior to the first membrane treatment.

* * * * *